(12) United States Patent
Tetsuo et al.

(10) Patent No.: US 7,740,366 B2
(45) Date of Patent: Jun. 22, 2010

(54) TWO-SIDED ILLUMINATION LED LENS AND LED MODULE AND LED TWO-SIDED ILLUMINATION SYSTEM USING THE SAME

(75) Inventors: Ariyoshi Tetsuo, Osaka (JP); Choul Ho Lee, Gyeonggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 12/212,967

(22) Filed: Sep. 18, 2008

(65) Prior Publication Data
US 2010/0020540 A1   Jan. 28, 2010

(30) Foreign Application Priority Data
Jul. 28, 2008   (KR) .................. 10-2008-0073420

(51) Int. Cl.
G09F 13/08 (2006.01)
(52) U.S. Cl. .................. 362/97.3; 362/97.1
(58) Field of Classification Search .................. 362/29, 362/30, 33, 97.1, 240, 241, 245, 559, 611–613, 362/616, 626, 633, 634, 800; 257/E33.07, 257/E33.072, E33.073, 98–100
See application file for complete search history.

(56) References Cited

U.S. PATENT DOCUMENTS 7,332,747 B2 *   2/2008   Uemura et al. ................. 257/98
2009/0007472 A1 *   1/2009   Kim ............................ 40/550

FOREIGN PATENT DOCUMENTS

JP   2005136224 A   *   5/2005
KR   10-2008-0000928 A       1/2008

* cited by examiner

*Primary Examiner*—Hargobind S Sawhney
(74) *Attorney, Agent, or Firm*—McDermott Will & Emery LLP

(57) ABSTRACT

The present invention relates to two-sided illumination LED lens and LED module and an LED two-sided illumination system using the same; and, more particularly, to two-sided illumination LED lens and LED module including an incidence unit on which light impinges; a first exit unit corresponding to the incidence unit and transmitting a portion of the light upward; a reflection unit extended from the first exit unit and reflecting another portion of the light; and a second exit unit facing the first exit unit and transmitting the light reflected at the reflection unit downward, and an LED two-sided illumination system using the same.

13 Claims, 5 Drawing Sheets

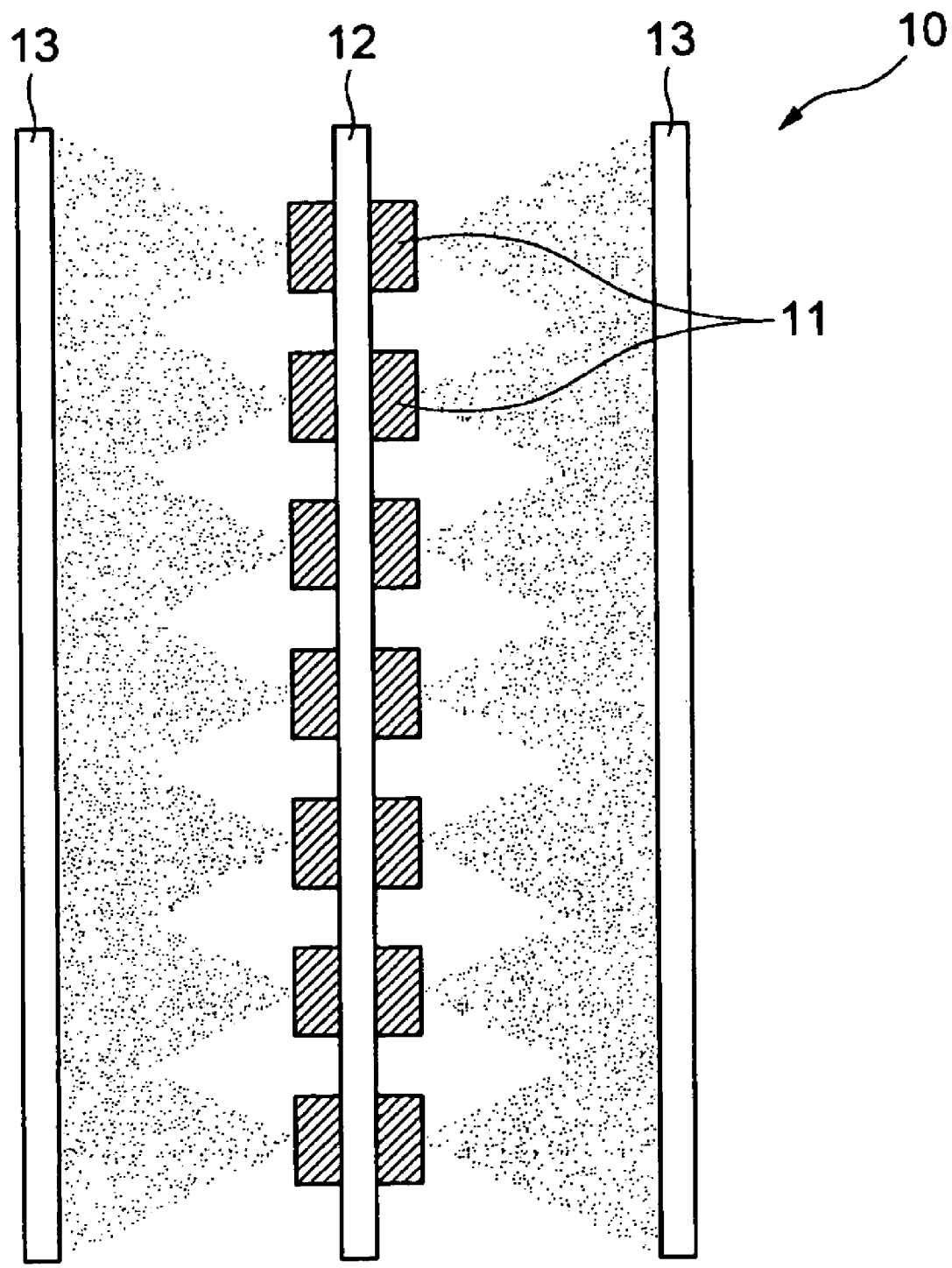
[FIG. 1]
- Prior Art -

[FIG. 2]
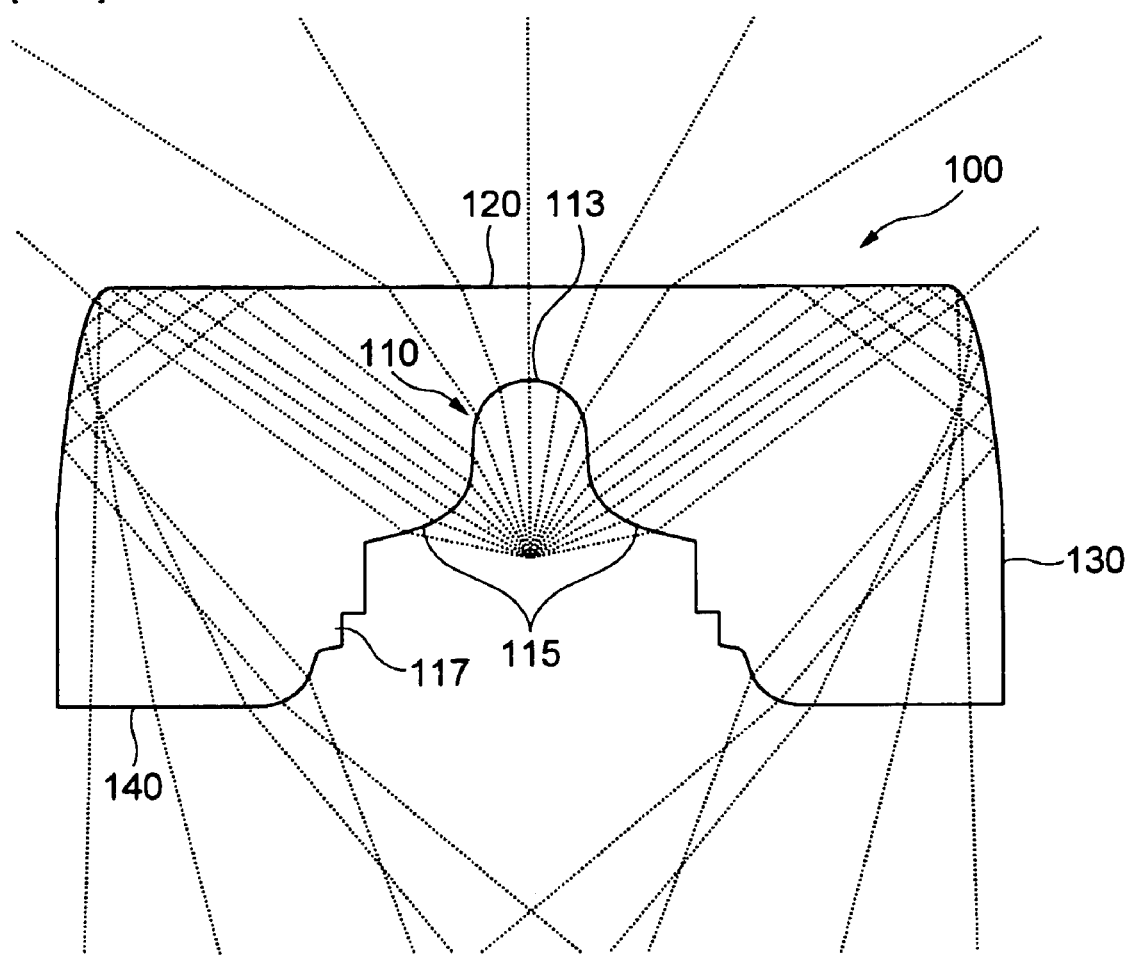

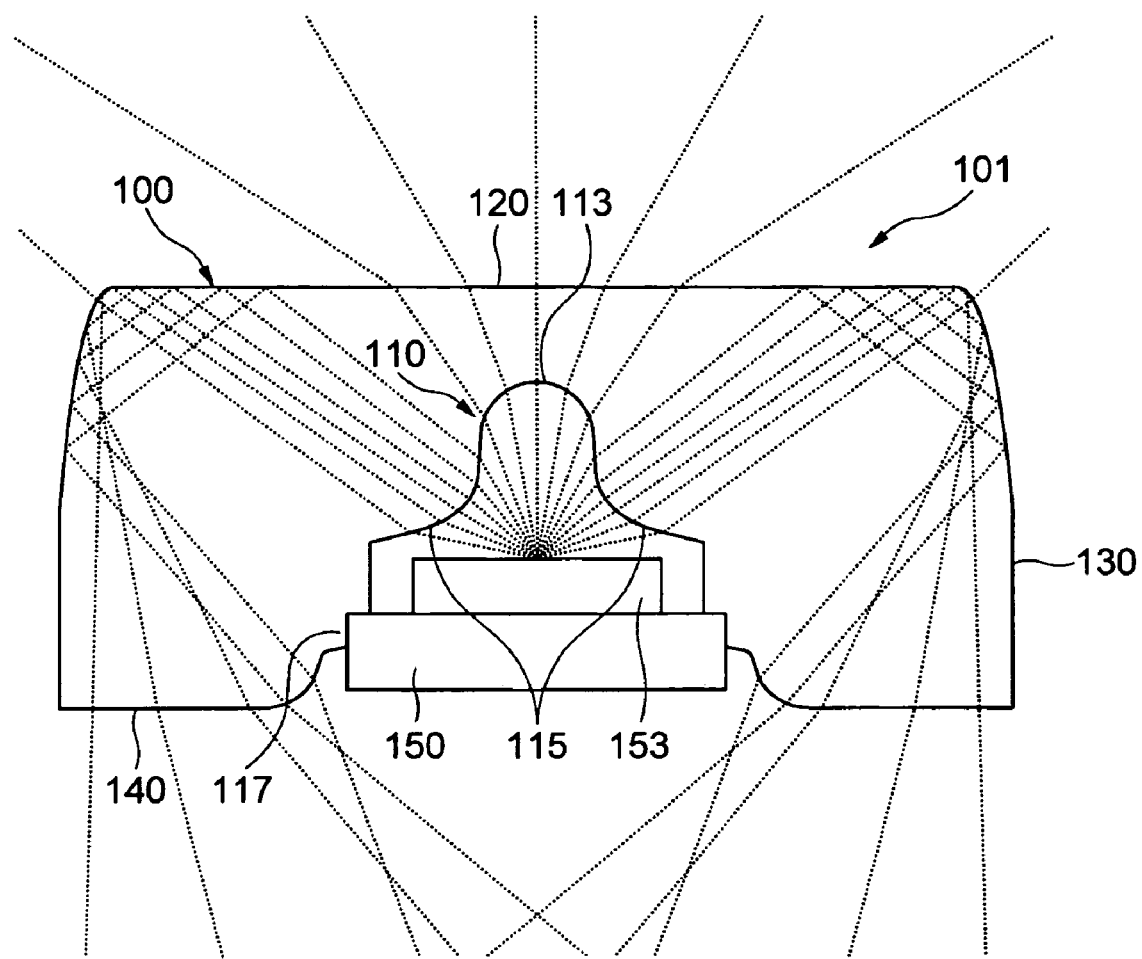
[FIG. 3]

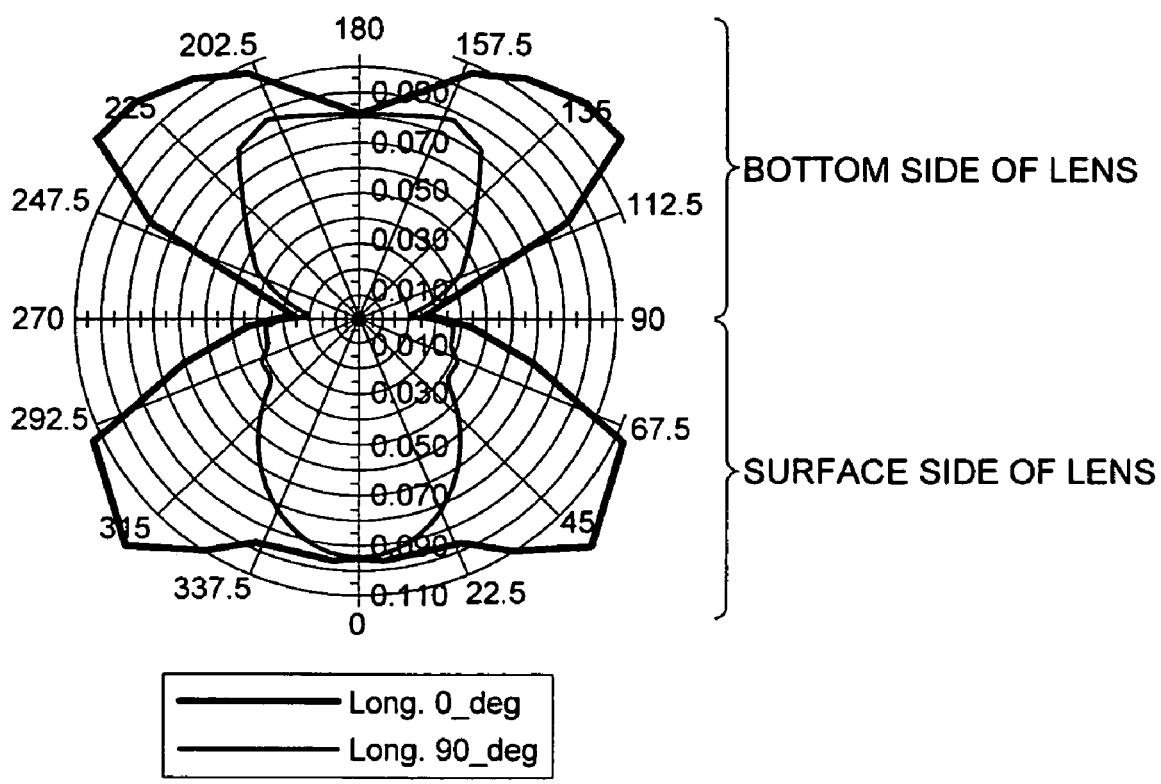

[FIG. 5]
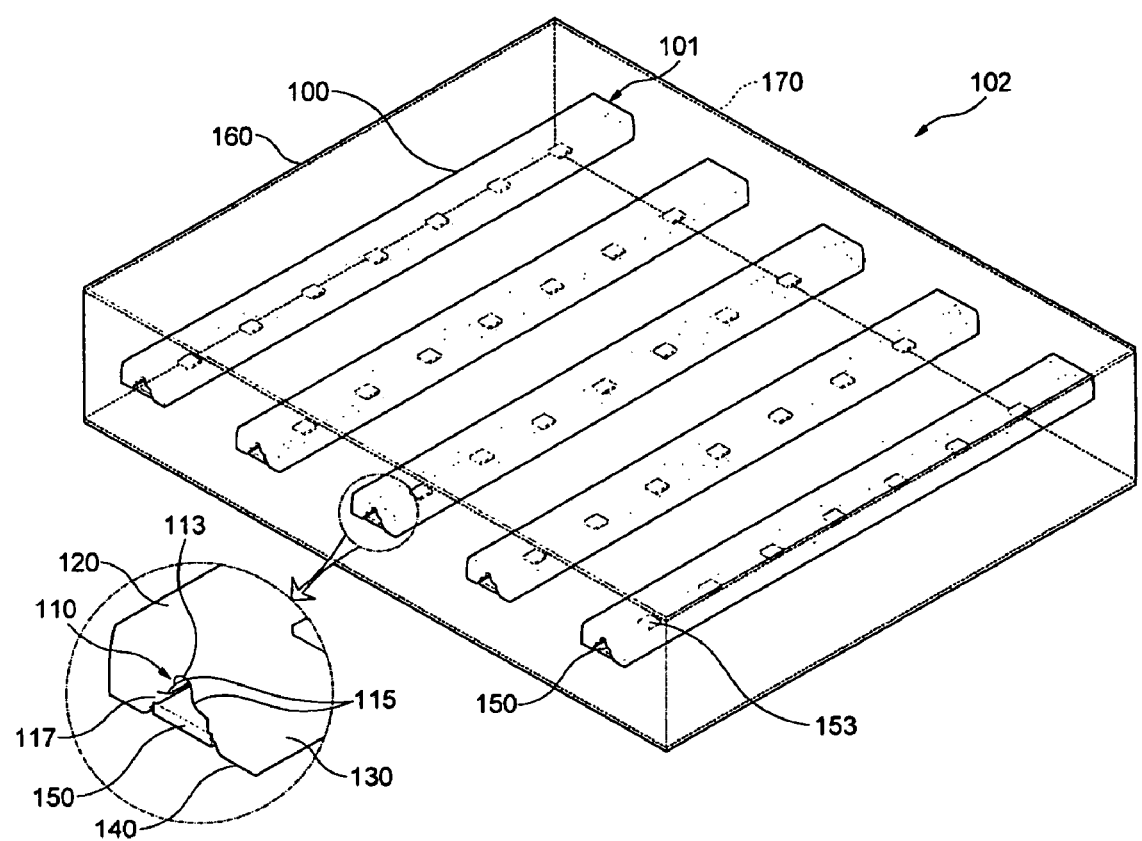

TWO-SIDED ILLUMINATION LED LENS AND LED MODULE AND LED TWO-SIDED ILLUMINATION SYSTEM USING THE SAME

CROSS-REFERENCE TO RELATED APPLICATIONS

This application claims the benefit of Korean Patent Application No. 10-2008-0073420 filed with the Korea Intellectual Property Office on Jul. 28, 2008, the disclosure of which is incorporated herein by reference.

BACKGROUND OF THE INVENTION

1. Field of the Invention

The present invention relates to two-sided illumination LED lens and LED module and an LED two-sided illumination system using the same; and, more particularly, to two-sided illumination LED lens and LED module capable of allowing an LED to illuminate two sides and an LED two-sided illumination system using the same.

2. Description of the Related Art

Generally, an LED(Light Emitting Diode) is a semiconductor light emitting device which emits light when a current flows and converts electric energy into light energy as a PN junction diode made of GaAs and GaN optical semiconductors.

A region of light emitted from the LED ranges from red (630 nm~700 nm) to blue-violet(400 nm) and also includes blue, green and white and the LED has advantages of low power consumption, high efficiency, a long operation lifetime and so on in comparison with conventional light such as an incandescent lamp and a fluorescent lamp and therefore the demand for the LED has been steadily increased.

Recently, an application range of the LED has been gradually expanded, that is, the LED has been applied to small illumination of a mobile terminal, illumination of a car, interior illumination, illumination of an exterior signboard or exterior illumination, and so on.

Particularly, the application range of the LED has been gradually expanded in the illumination signboard.

FIG. 1 is a cross-sectional view illustrating a two-sided illumination signboard 10 using a conventional LED.

Because unlike a fluorescent lamp, the general LED 11 irradiates light only to an emission surface and does not irradiate any light to an opposite surface thereof, as shown in FIG. 1, it needs to arrange the LEDs 11 and diffusion plates 13 on both sides of a circuit board 12.

Therefore, the construction of the two-sided illumination signboard using the LEDs has been complicated and the number of used LEDs has been increased, thereby augmenting a maintenance cost and a manufacture cost.

SUMMARY OF THE INVENTION

The present invention has been invented in order to overcome the above-described problems and it is, therefore, an object of the present invention to provide two-sided illumination LED lens and LED module and an LED two-sided illumination system using the same to allow an LED to illuminate two sides by manufacturing the two-sided illumination LED lens including a first exit unit corresponding to an incidence unit on which light impinges from the LED and transmitting a portion of the light upward, a reflection unit reflecting another portion of the light and a second exit unit transmitting the light reflected at the reflection unit downward.

The object of the present invention can be achieved by providing a two-sided illumination LED lens including an incidence unit on which light impinges; a first exit unit corresponding to the incidence unit and transmitting a portion of the light upward; a reflection unit extended from the first exit unit and reflecting another portion of the light; and a second exit unit facing the first exit unit and transmitting the light reflected at the reflection unit downward.

Further, the incidence unit may include an apex surface concavely formed in an incidence direction of the light and inclination surfaces extended from both sides of the apex surface to form curved parts.

Further, the incidence unit may further include step units spread and extended from the inclination surfaces.

Further, the LED lens may be processed through a method such as an injection molding or an extrusion molding.

Further, the LED lens may be made of optical glass or optical plastic.

Further, the object of the present invention can be achieved by providing a two-sided illumination LED module including a circuit board mounting an LED; and an LED lens mounted on an upper part of the circuit board and provided with an incidence unit on which light impinges from the LED, a first exit unit corresponding to the incidence unit and transmitting a portion of the light upward, a reflection unit extended from the first exit unit and reflecting another portion of the light; and a second exit unit facing the first exit unit and transmitting the light reflected at the reflection unit downward.

Further, the incidence unit of the LED lens may be formed in a curved part shape corresponding to the light and the circuit board may be inserted into step units which are expanded and extended from curved parts.

Further, the LED lens may be processed through injection molding, extrusion molding or the like.

Further, the LED lens may be made of optical glass or optical plastic.

The object of the present invention can be achieved by providing an LED two-sided illumination system including a case; a plurality of LED modules installed inside the case, wherein each of the LED modules is provided with a circuit board mounting an LED and an LED lens mounted on an upper part of the circuit board and having an incidence unit on which light impinges from the LED, a first exit unit corresponding to the incidence unit and transmitting a portion of the light upward, a reflection unit extended from the first exit unit and reflecting another portion of the light and a second exit unit facing the first exit unit and transmitting the light reflected at the reflection unit downward; and diffusion plates provided on upper and lower parts of the LED modules.

Further, the diffusion plates may be made of acryl.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a cross-sectional view illustrating a two-sided illumination signboard using a general LED;

FIG. 2 is a cross-sectional view illustrating a two-sided illumination LED lens in accordance with an embodiment of the present invention;

FIG. 3 is a cross-sectional view illustrating a two-sided illumination LED module in accordance with an embodiment of the present invention;

FIG. 4 is a view illustrating a result of simulation for the two-sided illumination LED module in accordance with the embodiment of the present invention; and FIG. 5 is a perspective view illustrating an LED two-sided illumination system in accordance with an embodiment of the present invention.

DETAILED DESCRIPTION OF THE PREFERABLE EMBODIMENTS

Hereinafter, a matter regarding to the operation effect including the technical construction for two-sided illumination LED lens and LED module and an LED two-sided illumination system using the same in accordance with the present invention will be clearly appreciated through the following detailed description with reference to the accompanying drawings illustrating preferable embodiments of the present invention.

Referring to FIG. 2 to FIG. 4, the two-sided illumination LED lens and LED module and the LED two-sided illumination system using the same will be described in detail.

FIG. 2 is a cross-sectional view illustrating a two-sided illumination LED lens in accordance with an embodiment of the present invention.

Referring to FIG. 2, in accordance with the embodiment of the present invention, a two-sided illumination LED lens 100 includes an incidence unit 110, a first exit unit 120, reflection units 130 and a second exit unit 140.

The incidence unit is a surface to which light is initially impinged and includes an apex surface 113 concavely formed in an incidence direction of the light and inclination surfaces 115 extended from both sides of the apex surface to form curved parts.

And, step units 117 are further formed by being spread and extended from the inclination surfaces 115.

The first exit unit 120 is positioned on a top surface corresponding to the incidence unit 110, a portion of the light impinged from the incidence unit 110 is refracted at the apex surface 113 to be transmitted upward and another portion of the light is refracted at the inclination surfaces 115 to be reflected to the reflection units 130.

The reflection units 130 are extended to lateral parts of the first exit unit 120 and refract or reflect the light reflected at the first exit unit 120 to the second exit unit 140.

The second exit unit 140 is positioned on a bottom surface facing the first exit unit 120 and refracts the light reflected at the reflection units 130 to transmit the light downward.

Therefore, the above-described two-sided illumination LED lens 100 is capable of transmitting the LED light to upper and lower parts of the two-sided illumination LED lens 100 by reflecting or refracting the LED light inside the two-sided illumination LED lens 100, thereby allowing the LED to illuminate both sides with respect to the LED.

And, the two-sided illumination LED lens 100 is processed through injection molding, extrusion molding, or the like and preferably made of optical glass with a high refractive index or a high dispersion index for light such as BK7 or SK5 or optical plastic such as polycarbonate and PMMA(PolyMethylMethAcrylate) with high transparency and internal uniformity.

FIG. 3 is a cross-sectional view illustrating a two-sided illumination LED module in accordance with an embodiment of the present invention.

Referring to FIG. 3, in accordance with an embodiment of the present invention, a two-sided illumination LED module 101 includes the two-sided illumination LED lens 100 as constructed in FIG. 2. At this time, the same component shown in FIG. 3 as the component shown in FIG. 2 is represented by the same numeral and hereinafter, the same description will be omitted.

The LED module 101 includes a circuit board 150 mounting an LED 153 and a two-sided illumination LED lens 100 as constructed in FIG. 2.

The circuit board 150 mounting the LED 153 mounts a drive IC(Integrated Circuit) for controlling a current supplied to the LED 153 or a connector for connection to external power, an device for protecting the LED 153, and so on and may be made of FR-4, metal or the like.

And, the two-sided illumination LED lens 100 is mounted on an upper part of the circuit board 150 mounting the LED 153.

At this time, the circuit board 150 mounting the LED 153 is inserted into step units 117 spread and extended from the inclination surfaces 115.

In the above-described two-sided illumination LED module 101, light impinged from the LED 153 is refracted at an incidence unit 110 and then impinged to the first exit unit.

When a part of the light impinged from the incidence unit 110 to the first exit unit 120 is emitted at a light emission angle of less than a critical angle, it is refracted at the apex surface 113 of the incidence unit 110 to be transmitted upward and when it is emitted at the light emission angle of the critical angle or above, it is refracted at the inclination surfaces 115 of the incidence unit 110, reflected at the first exit unit 120 and then reflected at the reflection units again.

When a part of the light reflected at the reflection units 130 is emitted at the light emission angle of less than a critical angle, it is transmitted from the reflection units 130 downward and when it is emitted at the light emission angle of the critical angle or above, it is reflected at the reflection units 130 to be transmitted through the second exit unit 140.

FIG. 4 is a view illustrating a result of simulation for the two-sided illumination LED module in accordance with the embodiment of the present invention.

Referring to FIG. 4, because the two-sided illumination LED module 101 includes the two-sided illumination LED lens 100 as shown in FIG. 2, the light intensity irradiated to an upper part of the two-sided illumination LED lens 100 ranges from 40% to 60% of light intensity of the LED 153 and the light intensity irradiated to a lower part of the two-sided illumination LED lens 100 ranges from 40% to 60% of the light intensity of the LED 153 and therefore, as shown in FIG. 4, it is possible to know that the light impinged from the LED 153 is transmitted to the upper and lower parts of the two-sided illumination LED lens 101 at an almost similar amount since the angle of light irradiated to the upper part of the LED lens 101 is almost the same as that of light irradiated to the lower part of the LED lens 101.

FIG. 5 is a perspective view illustrating an LED two-sided illumination system in accordance with an embodiment of the present invention.

As shown in FIG. 5, in accordance with the embodiment of the present invention, the LED two-sided illumination system 102 includes a plurality of the two-sided illumination LED modules as constructed in FIG. 3, a case 160 and diffusion plates 170. At this time, the same component shown in FIG. 4 as the component shown in FIG. 3 is represented by the same numeral and hereinafter, the same description will be omitted.

The case 160 protects the two-sided illumination LED modules 101 against an external environment and may be made of aluminum or the like.

The two-sided illumination LED modules 101 are arranged inside the case 160 at equal intervals and the diffusion plates 170 which are made of acryl are provided on upper and lower parts of the two-sided illumination LED modules 101.

The LED two-sided illumination system 102 as above described does not need to arrange LEDs on both sides of a circuit board by including the two-sided illumination LED module 101 as constructed in FIG. 3 different from a conventional method.

For example, if the size of the case 160 of the LED two-sided illumination system 102 is 600 mm×1000 mm, the interval between the two-sided illumination LED modules 101 is 50 mm and the distance between the diffusion plates 170 provided on the upper and lower parts of the two-sided illumination LED modules 101 is 65 mm, conventionally, approximately 750 LEDs were used, however, when using the two-sided illumination LED lens 100 in accordance with the present invention, approximately 340 LEDs 153 are used, thereby less using the LEDs 153 as much as by half of the conventionally used LEDs.

Therefore, in accordance with the embodiment of the present invention, the two-sided illumination LED lens 100 and LED module 101 and the LED two-sided illumination system 102 using the same are capable of reducing manufacture cost and time by implementing the two-sided illumination with the less number of LEDs 153 than the conventionally used LEDs because the LEDs 153 can illuminate two sides by manufacturing the two-sided illumination LED lens 100 including the first exit unit 120 corresponding to the incidence unit 110 on which light impinges from the LED 153 and transmitting a portion of the light upward, the reflection unit 130 reflecting another portion of the light and the second exit unit 140 transmitting the light reflected at the reflection unit 130 downward.

Further, the two-sided illumination LED lens is capable of being modularized, thereby improving assembly and productivity.

As described above, although the preferable embodiments of the present invention have been shown and described, it will be appreciated by those skilled in the art that substitutions, modifications and changes may be made in this embodiment without departing from the principles and spirit of the general inventive concept, the scope of which is defined in the appended claims and their equivalents.

What is claimed is:

1. A two-sided illumination LED lens comprising:
an incidence unit on which light impinges;
a first exit unit corresponding to the incidence unit and transmitting a portion of the light upward;
a reflection unit extended from the first exit unit and reflecting another portion of the light; and
a second exit unit facing the first exit unit and transmitting the light reflected at the reflection unit downward,
wherein the incidence unit includes inclination surfaces to refract light emitted at a light emission angle equal to or greater than the critical angle, wherein the incidence unit further includes an apex surface concavely formed in an incidence direction of the light and the inclination surfaces extending from both sides of the apex surface to form curved parts.

2. The two-sided illumination LED lens according to claim 1, wherein the incidence unit further includes step units spread and extending from the inclination surfaces.

3. The two-sided illumination LED lens according to claim 1, wherein the LED lens is processed through a method such as an injection molding or an extrusion molding.

4. The two-sided illumination LED lens according to claim 1, wherein the LED lens is made of optical glass or optical plastic.

5. The two-sided illumination LED lens according to claim 1, wherein the light refracted at the inclination surfaces is totally reflected at the first exit unit and the reflection units.

6. The two-sided illumination LED lens according to claim 1, wherein the incidence unit further includes an apex surface concavely formed in an incidence direction of the light and the inclination surfaces extending from both sides of the apex surface and the light refracted at the inclination surface is totally reflected at the first exit unit and the reflection units.

7. A two-sided illumination LED module comprising:
a circuit board mounting an LED; and
an LED lens mounted on an upper part of the circuit board and including an incidence unit on which light impinges from the LED, a first exit unit corresponding to the incidence unit and transmitting a portion of the light upward, a reflection unit extended from the first exit unit and reflecting another portion of the light and a second exit unit facing the first exit unit and transmitting the light reflected at the reflection unit downward,
wherein the incidence unit includes inclination surfaces to refract light emitted at a light emission angle equal to or greater than the critical angle, wherein the incidence unit of the LED lens further includes an apex surface concavely formed in an incidence direction of the light and the inclination surfaces extending from both sides of the apex surface to form curved parts and the circuit board is inserted into step units formed by being spread and extending from the inclination surfaces.

8. The two-sided illumination LED module according to claim 7, wherein the LED lens is processed through a method such as an injection molding or an extrusion molding.

9. The two-sided illumination LED module according to claim 7, wherein the LED lens is made of optical glass or optical plastic.

10. The two-sided illumination LED module according to claim 7, wherein the light refracted at the inclination surface is totally reflected at the first exit unit and the reflection units.

11. The two-sided illumination LED module according to claim 7, wherein the incidence unit further includes an apex surface concavely formed in an incidence direction of the light and the inclination surfaces extending from both sides of the apex surface and the light refracted at the inclination surface is totally reflected at the first exit unit and the reflection units.

12. An LED two-sided illumination system comprising:
a case;
a plurality of LED modules installed inside the case, wherein each of the LED modules is provided with a circuit board mounting an LED and an LED lens mounted on an upper part of the circuit board and including an incidence unit on which light impinges from the LED, a first exit unit corresponding to the incidence unit and transmitting a portion of the light upward, a reflection unit extended from the first exit unit and reflecting another portion of the light and a second exit unit facing the first exit unit and transmitting the light reflected at the reflection unit downward; and
diffusion plates provided on upper and lower parts of the LED modules.

13. The LED two-sided illumination system according to claim 12, wherein the diffusion plates are made of acryl.

* * * * *